United States Patent
Yokoi

(10) Patent No.: US 10,144,132 B2
(45) Date of Patent: Dec. 4, 2018

(54) ROBOT CONTROLLING METHOD, ROBOT APPARATUS, PROGRAM AND RECORDING MEDIUM

(71) Applicant: CANON KABUSHIKI KAISHA, Tokyo (JP)

(72) Inventor: Akiyoshi Yokoi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 89 days.

(21) Appl. No.: 15/058,904

(22) Filed: Mar. 2, 2016

(65) Prior Publication Data

US 2016/0263747 A1    Sep. 15, 2016

(30) Foreign Application Priority Data

Mar. 13, 2015 (JP) ................................ 2015-050261

(51) Int. Cl.
    *B25J 9/16*      (2006.01)
    *G05B 19/402*      (2006.01)

(52) U.S. Cl.
    CPC ........... *B25J 9/1692* (2013.01); *B25J 9/1633* (2013.01); *B25J 9/1669* (2013.01); *B25J 9/1687* (2013.01);
    (Continued)

(58) Field of Classification Search
    CPC ...... B25J 9/1692; B25J 9/1633; B25J 9/1664; B25J 9/1669; B25J 9/1687;
    (Continued)

(56) References Cited

U.S. PATENT DOCUMENTS

| 4,763,992 A | 8/1988 | Takada |
| 5,519,937 A | 5/1996 | Soriano |

(Continued)

FOREIGN PATENT DOCUMENTS

| CN | 101842195 | 9/2010 |
| CN | 102779771 | 11/2012 |

(Continued)

OTHER PUBLICATIONS

European Search Report dated Jul. 25, 2016 during prosecution of related European application No. 16159319.9.

(Continued)

*Primary Examiner* — Spencer D Patton
(74) *Attorney, Agent, or Firm* — Fitzpatrick, Cella, Harper & Scinto

(57) ABSTRACT

A control apparatus makes a robot hand grip a work for measurement. The control apparatus controls the operation of a robot arm so that the robot arm keeps a force of striking the work for measurement against a reference constant, while making the end portion of the robot arm rotate around the end axis, in a state of making the outer periphery F3 of the work for measurement, which is gripped by the robot hand, strike against the reference jig. The control apparatus acquires a detection result detected by an encoder of each of the joints when the end portion of the robot arm has been rotated. The control apparatus calculates a correction amount of trajectory data based on eccentricity of a central axis with respect to an end axis, by using the detection result of the encoder, and corrects the trajectory data, based on the correction amount.

9 Claims, 13 Drawing Sheets

(52) U.S. Cl.
CPC .. G05B 19/402 (2013.01); *G05B 2219/39017* (2013.01); *G05B 2219/39024* (2013.01); *G05B 2219/39041* (2013.01); *G05B 2219/39183* (2013.01); *G05B 2219/39325* (2013.01); *G05B 2219/39529* (2013.01)

(58) Field of Classification Search
CPC .............. G05B 19/4015; G05B 19/402; G05B 2219/39024; G05B 2219/39026; G05B 2219/39032; G05B 2219/39021; G05B 2219/39325; G05B 2219/39018; G05B 2219/39041
See application file for complete search history.

(56) References Cited

U.S. PATENT DOCUMENTS

| 2014/0277720 | A1* | 9/2014 | Izumi | B25J 9/1687 |
| | | | | 700/253 |
| 2016/0184996 | A1* | 6/2016 | Ishige | B25J 9/1692 |
| | | | | 700/254 |

FOREIGN PATENT DOCUMENTS

| EP | 2 783 805 | 1/2014 |
| EP | 2 783 805 | 10/2014 |
| EP | 2 837 472 | 2/2015 |
| JP | 60-107023 | 6/1985 |
| JP | 1-58490 | 12/1989 |
| JP | 2014-58003 | 4/2014 |
| WO | 2011/077693 | 6/2011 |

OTHER PUBLICATIONS

Chinese Office Action dated Jun. 25, 2018 during prosecution of related Chinese application No. 201610139544.5. (Whole English-language translation included.).

* cited by examiner

AT J6 ROTATION ANGLE OF 0-DEGREE ANGLE

AT J6 ROTATION ANGLE OF 90-DEGREE ANGLE

AT J6 ROTATION ANGLE OF 180-DEGREE ANGLE

AT J6 ROTATION ANGLE OF 270-DEGREE ANGLE

ROBOT CONTROLLING METHOD, ROBOT APPARATUS, PROGRAM AND RECORDING MEDIUM

BACKGROUND OF THE INVENTION

Field of the Invention

The present invention relates to a robot controlling method, a robot apparatus, a program and a recording medium, for controlling an operation of a multi-joint robot arm.

Description of the Related Art

In recent years, the requirement of automation has increased for an assembly of products such as electronic equipment, which have a small size and a complicated structure. These products need to be precisely assembled by a small-sized robot, with high speed and according to fine force control.

For this reason, when the robot is used, the operation needs to be precisely calibrated, and various calibration apparatuses (calibration jigs) and calibration methods are proposed. For instance, a calibration apparatus is disclosed which uses two micro displacement measures and columnar jigs, thereby rotates an end axis of a robot, reads out signals of the micro displacement measures, and calibrates the end axis of the robot, based on the read out information (see Japanese Patent Application Laid-Open No. H01-58490).

In addition, in recent years, a production site is required to be converted into cells for enhancing the efficiency of the production, and a robot apparatus is widely used which is provided with a robot hand that enables a plurality of operation steps to be executed. Such a robot apparatus is required to have high operation precision because of making the robot hand perform various operation steps, and needs to have high calibration precision associated with the high operation precision. In the case of a robot hand having a plurality of (for instance, three) claws, a position of a central axis of a gripped work is determined by each of the positions of the plurality of claws, at the time when the robot hand has gripped the work, and accordingly the eccentricity of the plurality of claws needs to be calibrated beforehand.

On the other hand, a calibration method is disclosed that calibrates the eccentricity of the end axis of the robot of which the robot hand grips a spherical component that has been rotatably supported by an elastic axis fixed on a trestle on which the work is mounted (see Japanese Patent Application Laid-Open No. 2014-058003).

However, in the calibration apparatus described in Japanese Patent Application Laid-Open No. H01-58490, the micro displacement measure has been necessary for measurement. On the other hand, Japanese Patent Application Laid-Open No. 2014-058003 proposes a method for calibrating the position of the claws of the robot hand without using the micro displacement measure. However, in the method in Japanese Patent Application Laid-Open No. 2014-058003, such a complicated adjustment operation has been needed as to calculate a calibration amount necessary for calibrating the eccentricity of the central axis of the plurality of claws, based on a force which has been detected by a force sensor, and make the plurality of claws move with respect to the robot arm by the calculated calibration amount to calibrate the position.

SUMMARY OF THE INVENTION

Then, an object of the present invention is to calibrate the position of the robot hand without using a special measuring instrument such as the micro displacement measure, and without performing a complicated adjustment operation for the robot hand.

According to an aspect of the present invention, a robot controlling method in which a robot hand is attached to the end portion of a robot arm having a plurality of joints, each of the joints of the robot arm has a joint driving apparatus that has a motor and a joint angle detecting unit that detects a joint angle, and a control apparatus that controls an operation of the robot arm, based on trajectory data for performing the operation, comprises: gripping in which the control apparatus makes the robot hand grip a symmetrically shaped member having such a shape as to be rotationally symmetric with respect to the central axis; operating in which the control apparatus controls the operation of the robot arm so that the robot arm keeps a force of striking the symmetrically shaped member against a reference member constant, while making the end portion of the robot arm rotate around the end axis, in a state of making the outer periphery of the symmetrically shaped member, which is gripped by the robot hand, strike against the reference member; acquiring in which the control apparatus acquires a detection result which has been detected by the joint angle detecting unit of each of the joints when the end portion of the robot arm is rotated in the operating; and correcting in which the control apparatus calculates a correction amount of the trajectory data based on eccentricity of the central axis with respect to the end axis, by using the detection result which the control apparatus has acquired in the acquiring, and corrects the trajectory data, based on the correction amount.

The robot controlling method according to the present invention calculates a correction amount based on the eccentricity, from the angle of each joint, and corrects the trajectory data of the robot arm, based on the correction amount; and accordingly can calibrate the position of the robot hand without using the special measuring instrument such as the micro displacement measure. In addition, the robot controlling method calibrates the position of the robot hand by correcting the trajectory data of the robot arm, and accordingly does not need to perform the complicated adjustment operation for the robot hand.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
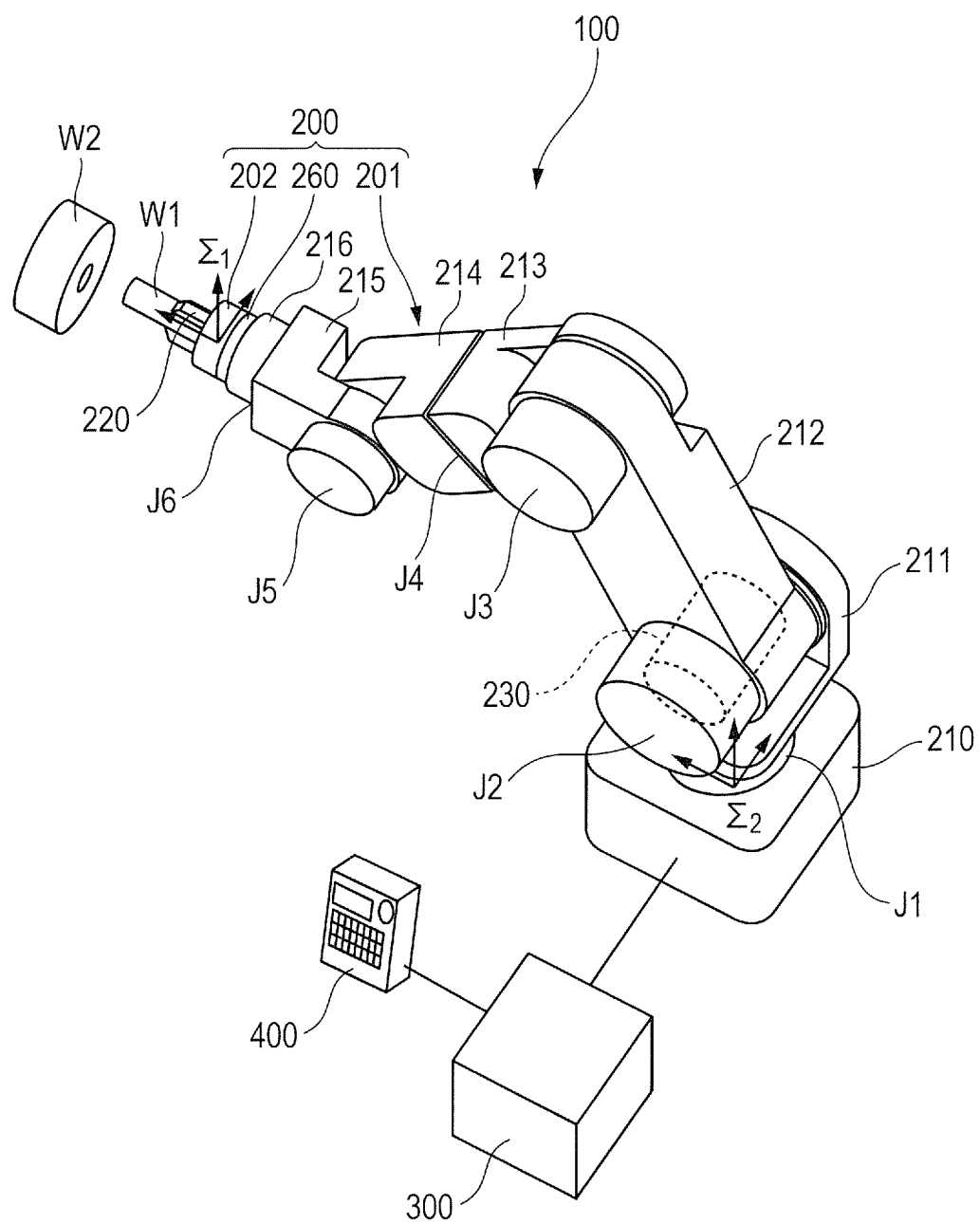
FIG. 1 is a perspective view illustrating a robot apparatus according to a first embodiment.

FIG. 1 is a perspective view illustrating a robot apparatus according to a first embodiment of the present invention. A robot apparatus 100 includes a robot 200, a control apparatus 300 which controls an operation of the robot 200, and a teaching pendant 400 which functions as a teaching section for teaching the operation of the robot 200 by an operation of a user.

The robot 200 has a vertical multi-joint type of robot arm 201, and a robot hand 202 which works as an end effector that is attached to an end portion of the robot arm 201. In addition, the robot 200 has a force sensor 260 which is arranged between the robot arm 201 and the robot hand 202, and is a force sensor that detects a force to be exerted on the robot hand 202. In other words, the robot hand 202 is attached to the end portion of the robot arm 201 through the force sensor 260.

The force sensor 260 detects forces in three axis directions which are perpendicular to each other, and moments around the three axes, respectively, in the end portion of the robot arm 201, in other words, in a coordinate system (tool coordinate system) $\Sigma_1$ in the robot hand 202. Hereafter, the force and the moment which are detected by this force sensor 260 are simply referred to as "force". This force sensor 260 is used for controlling the assembly at the time of an assembly operation such as a fitting operation, in other words, for controlling compliance.

In the robot arm 201, a plurality of links 211 to 216 which transmit the displacement and the force is connected with a base portion (base end link) 210 which is fixed to a work bench, at joints J1 to J6 so as to be capable of being inflexed (swirled) or being rotated. In the first embodiment, the robot arm 201 is structured of the joints J1 to J6 of six axes which are three axes that inflect and three axes that rotate. Here, the inflection means that two links are inflected at a certain point of the connected portion thereof, and the rotation means that the two links rotate relatively around the rotary shaft extending in the longitudinal directions thereof; and both are referred to as an inflection portion and a rotary portion, respectively. The robot arm 201 is structured of the six joints J1 to J6 in which the joints J1, J4 and J6 are the rotary portions, and the joints J2, J3 and J5 are the inflection portions.

The robot hand 202 has a plurality of fingers (for instance, claws) 220, and is attached to the end portion of the robot arm 201, specifically, to the end portion of a link (end link) 216, through the force sensor 260. The plurality of fingers 220 are supported by a hand base so as to move toward the inside and the outside in a radial direction which regards the central axis as the center, with respect to the hand base. The plurality of fingers 220 can grasp a work W1 which is a first work, when being operated to close (operated toward the inside in radial direction), and the plurality of fingers 220 can release the grasp of the work W1, when being operated to open (operated toward the outside in radial direction). By grasping the work W1 while using the plurality of fingers 220, the robot hand 202 can perform a fitting operation of fitting the work (fitting component) W1 which is the first work into a work (component to be fitted) W2 which is a second work.

The robot arms 201 are provided on the joints J1 to J6, respectively, and have a plurality of (six) joint driving apparatuses 230 for driving the joints J1 to J6, respectively. Incidentally, in FIG. 1, the joint driving apparatus 230 is illustrated only on the joint J2 for convenience and the illustration is omitted on other joints J1 and J3 to J6, but the joint driving apparatus 230 having a similar structure is arranged also in the other joints J1 and J3 to J6.

Figure 2:
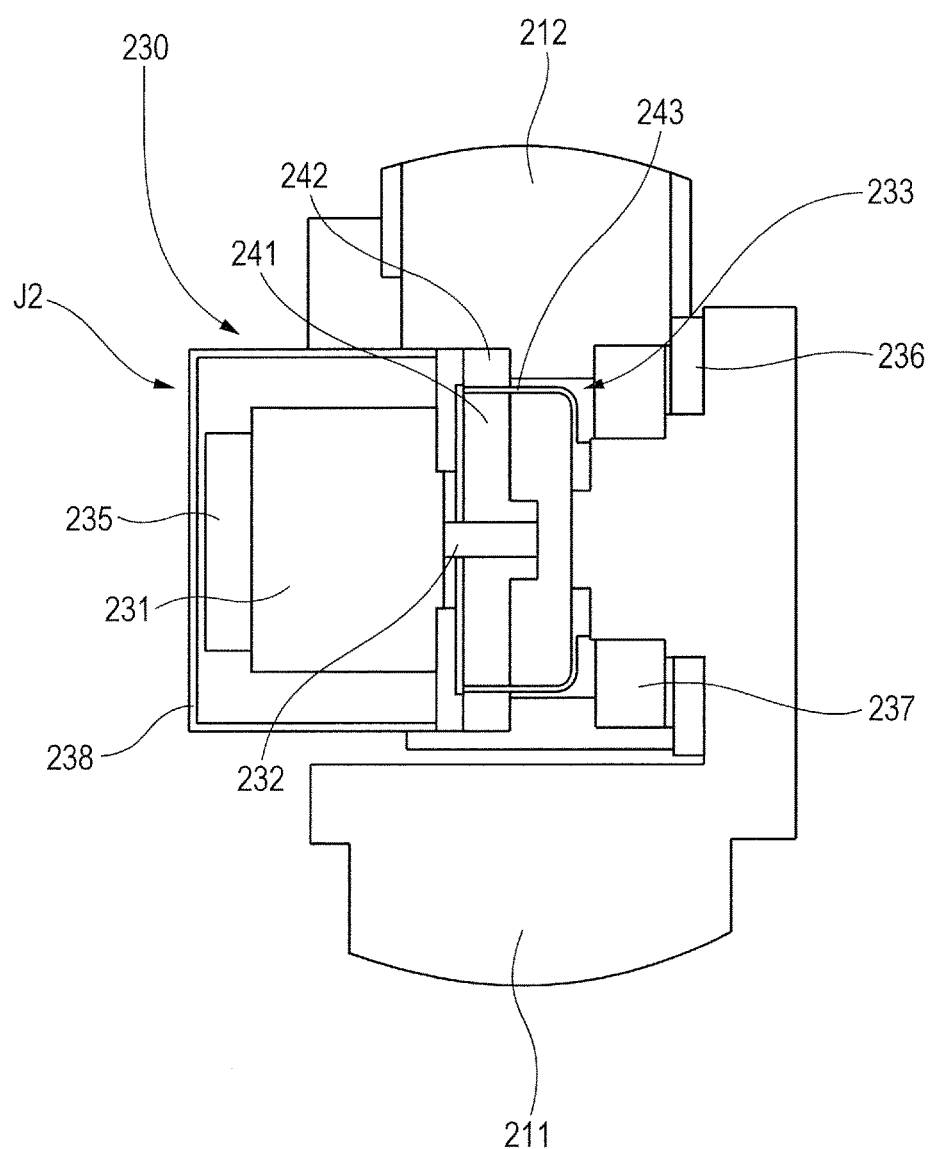
FIG. 2 is a partial sectional view illustrating a joint of a robot arm of the robot apparatus according to the first embodiment.

FIG. 2 is a partial sectional view illustrating the joint J2 of the robot arm 201. The joint J2 will be representatively described below as an example. The description concerning the other joints J1 and J3 to J6 will be omitted, because the other joints have the similar structures.

The joint driving apparatus 230 has a rotary motor (hereafter referred to as "motor") 231 which is an electric motor, and a speed reducer 233 which decelerates the rotation of a rotary shaft 232 of the motor 231. The joint J2 has an encoder 235 which is a motor angle detecting unit that detects a rotation angle of the rotary shaft 232 (input axis of speed reducer 233) of the motor 231. The joint J2 has also an encoder 236 which is a joint angle detecting unit that detects an angle (rotation angle of output axis of speed reducer 233) of the link 212 with respect to the link 211. In other words, the encoder 236 detects the angle (joint angle) of the joint J2. The motor 231 is a servo motor, and is, for instance, a brushless DC servo motor or an AC servo motor.

The encoder 235 is desirably an absolute-type rotary encoder, which is structured so as to have an encoder of the absolute angle of one revolution, a counter for counting a total number of rotations in the encoder of the absolute angle, and a backup battery which supplies an electric power to the counter. Even if an electric power supply to the robot arm 201 is shut off, as long as this backup battery is effective, the total number of rotations is held in the counter, regardless of ON and OFF of the electric power supply to the robot arm 201. Accordingly, an attitude of the robot arm 201 can be controlled. Incidentally, the encoder 235 is attached to the rotary shaft 232, but may be attached to the input axis of the speed reducer 233.

The encoder 236 is a rotary encoder which detects a relative angle between two adjacent links. In the joint J2, the encoder 236 is a rotary encoder which detects the relative angle between the link 211 and the link 212. The encoder 236 has a structure in which an encoder scale is provided on the link 211 and a detecting head is provided on the link 212, or has a reversed structure.

In addition, the link 211 and the link 212 are rotatably connected through a cross roller bearing 237. The motor 231 is covered with and protected by a motor cover 238. An unillustrated brake unit is provided between the motor 231 and the encoder 235. The main function of the brake unit is to hold an attitude of the robot arm 201 when the power source has been turned off.

The speed reducer 233 is a speed reducer with a wave motion gear, which is small-sized and lightweight and has a large reduction ratio, in the first embodiment. The speed reducer 233 has a web generator 241 which is an input axis and is connected with the rotary shaft 232 of the motor 231, and a circular spline 242 which is an output axis and is fixed to the link 212. Incidentally, the circular spline 242 is directly connected to the link 212, but may be formed integrally with the link 212.

In addition, the speed reducer 233 is arranged between the web generator 241 and the circular spline 242, and is provided with a flexible spline 243 which is fixed to the link 211. The flexible spline 243 is decelerated by a reduction ratio of N with respect to the rotation of the web generator 241, and rotates relatively to the circular spline 242. Accordingly, the rotation of the rotary shaft 232 of the motor 231 is decelerated by a reduction ratio of 1/N in the speed reducer 233, relatively rotates the link 212 to which the circular spline 242 is fixed, with respect to the link 211 to which the flexible spline 243 is fixed, and inflects the joint J2.

Figure 3:
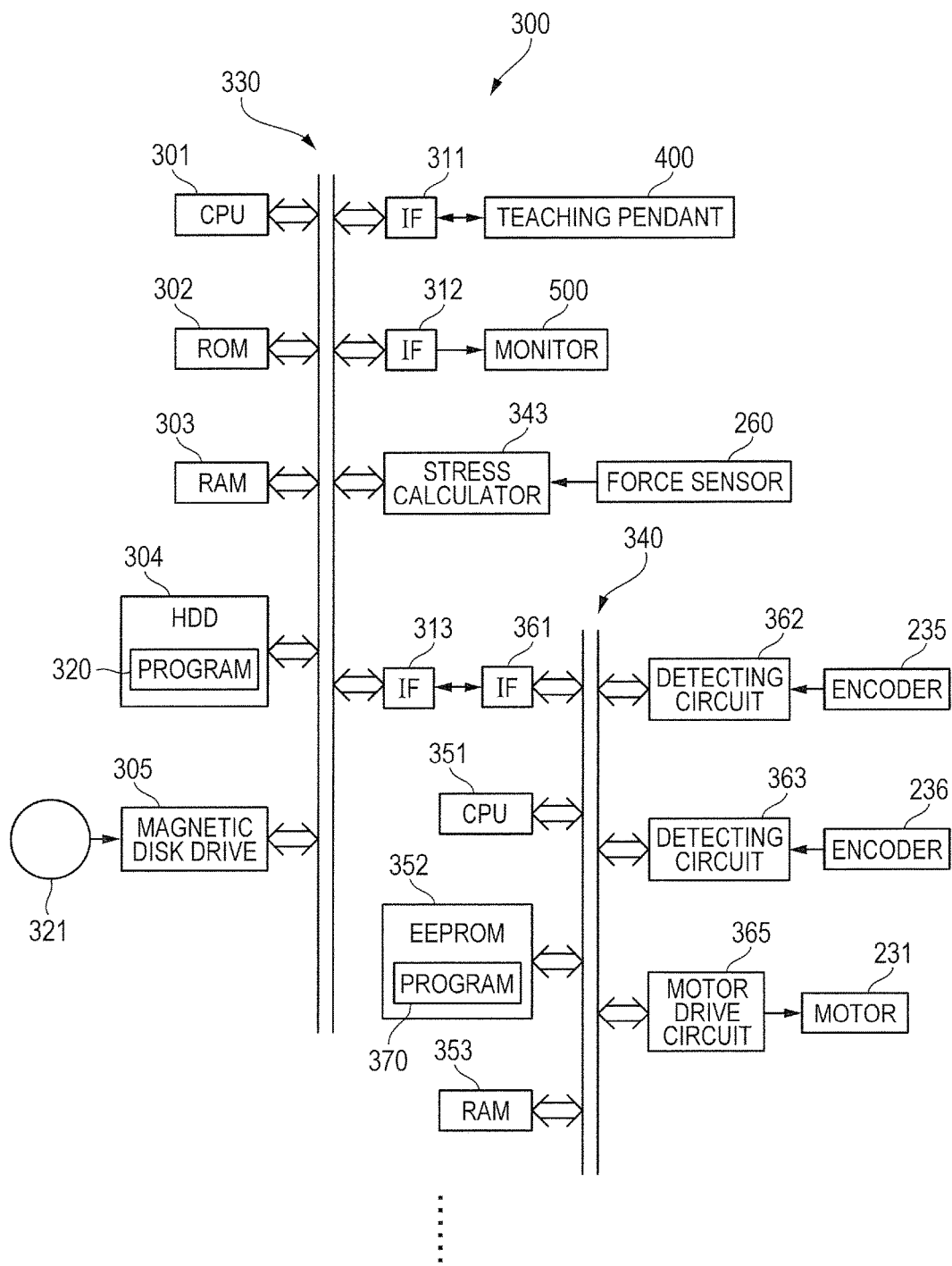
FIG. 3 is a block diagram illustrating a configuration of a control apparatus of the robot apparatus according to the first embodiment.

FIG. 3 is a block diagram illustrating a configuration of a control apparatus 300 of the robot apparatus 100. The control apparatus 300 has a main controlling unit 330, and a plurality (number which corresponds to the number of joints: six in the first embodiment) of joint controlling units 340.

The main controlling unit 330 is structured of a computer, and is provided with a CPU (Central Processing Unit) 301 which functions as an arithmetic operation unit. The main controlling unit 330 also has a ROM (Read Only Memory) 302, a RAM (Random Access Memory) 303, and an HDD (Hard Disk Drive) 304, as a storage unit. The main controlling unit 330 also has a magnetic disk drive 305, various interfaces 311 to 313, and a stress calculator 343.

The ROM 302, the RAM 303, the HDD 304, the magnetic disk drive 305, the various interfaces 311 to 313 and the stress calculator 343 are connected to the CPU 301 through buses. The ROM 302 stores a basic program such as BIOS therein. The RAM 303 is a storage device which temporarily stores various data therein such as a result of the arithmetic processing of the CPU 301.

The HDD 304 is a storage device which stores the result of the arithmetic processing of the CPU 301, and various data and the like acquired from the outside; and is also a recording device which records a program 320 therein for making the CPU 301 execute the arithmetic processing which will be described later. The CPU 301 executes each step of the robot controlling method, based on the program 320 which is recorded (stored) in the HDD 304.

The magnetic disk drive 305 can read out various data, a program and the like which have been recorded in a recording disk 321. Incidentally, an illustrated external storage device such as a rewritable nonvolatile memory and an external HDD may be connected to the main controlling unit 330.

The teaching pendant 400 which is the teaching section is connected to an interface 311. The teaching pendant 400 is a section that appoints a teaching point at which the teaching pendant teaches the robot 200, in other words, appoints a target joint angle of each of the joints J1 to J6 (target rotation position of motor 231 of each of joints J1 to J6), by the input operation of the user. The data of the teaching point is output to the HDD 304 through the interface 311 and the bus.

The HDD 304 can store the data of the teaching point therein which has been appointed by the teaching pendant 400. The CPU 301 can read out the data of the teaching point which has been set (stored) in the HDD 304.

A display device (monitor) 500 which is a display unit is connected to the interface 312, and displays an image under the control of the CPU 301.

The force sensor 260 is connected to the stress calculator 343. The stress calculator 343 determines forces (forces of three axes and moments of three axes) based on signals sent from the force sensor 260, and outputs signals which show the determined forces, to the CPU 301.

The joint controlling unit 340 is connected to the interface 313. Incidentally, in the first embodiment, the robot arm 201 has the six joints J1 to J6, and accordingly the control apparatus 300 has the six joint controlling units 340; but in FIG. 3, only one joint controlling unit 340 is illustrated, and the illustration of the other five joints is omitted. Each of the joint controlling units 340 is arranged in a housing of the control apparatus 300. Incidentally, the position at which each of the joint controlling units 340 is arranged is not limited to the inside of the housing, and may be arranged, for instance, in the robot arm 201.

The CPU 301 calculates a trajectory of the robot arm 201 based on a predetermined set teaching point, and outputs a signal of the position command which indicates the target rotation position (control amount of rotation angle) of the rotary shaft 232 of the motor 231, to each of the joint controlling units 340 at predetermined time intervals.

The joint controlling unit 340 has a CPU 351, an EEPROM 352 and a RAM 353 which function as the storage units, an interface 361, detecting circuits 362 and 363, and a motor drive circuit 365; and is configured so that the components are connected to each other through buses.

The CPU 351 executes arithmetic processing according to a program 370. The EEPROM 352 is a storage device which stores the program 370 therein. The RAM 353 is a storage device which temporarily stores various data therein such as the result of the arithmetic processing of the CPU 351.

The main controlling unit 330 has a plurality (six) of interfaces 313 (though only one is illustrated in FIG. 3). Each of the interfaces 313 is connected to the interface 361 of each of the joint controlling units 340 through a cable or the like, and the signals can be transmitted and received between the main controlling unit 330 and each of the joint controlling units 340.

The encoder 235 is connected to the detecting circuit 362, and the encoder 236 is connected to the detecting circuit 363. A pulse signal which indicates a detected value of the detected angle is output from each of the encoders 235 and 236.

The detecting circuits 362 and 363 acquire the pulse signals from the encoders 235 and 236, respectively, convert the signals into signals which can be acquired by the CPU 351, and output the resultant signals to the CPU 351.

A motor drive circuit 365 is, for instance, a motor driver having a semiconductor switching element therein, and outputs a voltage having a PWM waveform of a three-phase alternating current of which the pulse width has been modulated, to the motor 231, in response to an input electric current command, and thereby supplies the electric current to the motor 231.

The CPU 351 of each of the joint controlling units 340 computes the amount of the electric current (electric current command) to be output to the motor 231 so that the rotation position (rotation angle) of the motor 231 approaches the position command which has been input by the CPU 301 of the main controlling unit 330 and which the CPU 351 has received, and outputs the computed electric current command to the motor drive circuit 365.

The motor drive circuit 365 supplies an electric current which corresponds to the electric current command that is input by the CPU 351 and which the motor drive circuit 365 has received, to the motor 231. Then, the motor 231 receives the electric power supply from the motor drive circuit 265 to generate a driving torque, and transmits the torque to the web generator 241 which is the input axis of the speed reducer 233. In the speed reducer 233, the circular spline 242 which is the output axis rotates at a rotation number of 1/N of the rotation of the web generator 241. Thereby, the link 212 rotates relatively with respect to the link 211.

Thus, each of the joint controlling units 340 supplies the electric current to the motor 231 so that the rotation position of the motor 231 approaches the position command which is input by the main controlling unit 330 and which the joint controlling unit has received, and controls the joint angle of each of the joints J1 to J6.

Incidentally, in the first embodiment, the case will described where the computer-readable recording medium is the HDD 304 and the EEPROM 352, and the programs 320 and 370 are stored in the HDD 304 and the EEPROM 352, but the present invention is not limited to the case. The programs 320 and 370 may be recorded in any recording medium, as long as the recording medium can be read out by the computer. For instance, the recording disk 321 which is illustrated in FIG. 3, an unillustrated external storage device and the like may be used as the recording medium for supplying the programs 320 and 370. If the specific examples of the recording medium are described, the usable examples include a flexible disk, a hard disk, an optical disk, a photomagnetic disk, a CD-ROM, a CD-R, a magnetic tape, a nonvolatile memory and a ROM.

Figure 4:
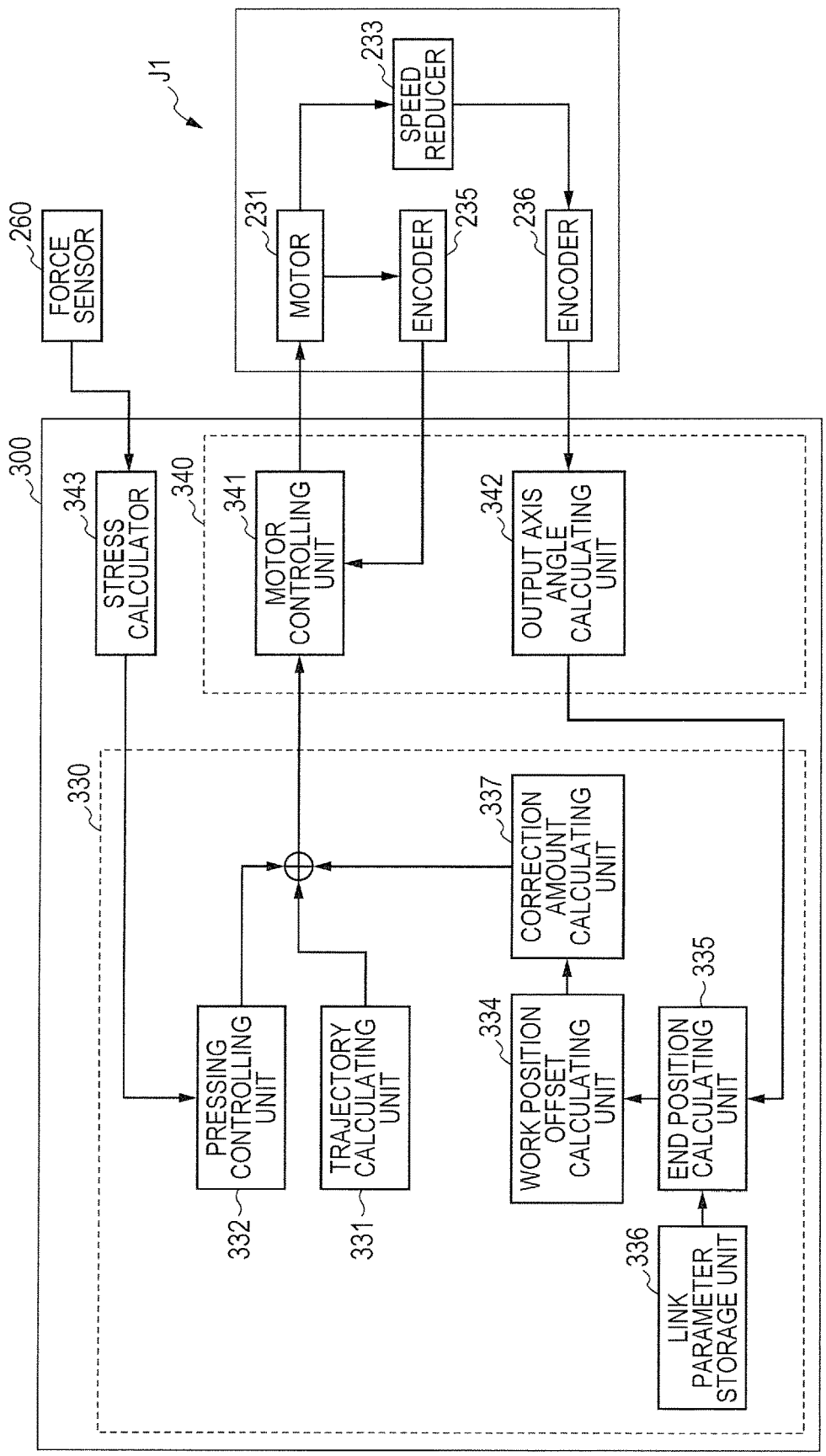
FIG. 4 is a functional block diagram illustrating a configuration of an essential part of the robot apparatus according to the first embodiment.

FIG. 4 is a functional block diagram illustrating a configuration of an essential part of the robot apparatus according to the first embodiment of the present invention. In FIG. 4, the functions of the CPU 301 based on the program 320 are broken into blocks, and the blocks are illustrated; and the functions of the CPU 351 and the functions of the motor drive circuit 365 based on the program 370 are broken into blocks, and the blocks are illustrated. In the robot 200, the joint J1 of the robot arm 201 is broken into blocks, and the blocks are illustrated.

The control apparatus 300 has a main controlling unit 330, and a joint controlling unit 340 which corresponds to each of the joints J1 to J6. In FIG. 4, only the joint J1 and the joint controlling unit 340 which corresponds to the joint J1 are illustrated, but the control apparatus 300 has the plurality of joint controlling units 340 which correspond to the other joints J2 to J6, respectively, though the illustration is omitted.

The main controlling unit 330 is structured of a trajectory calculating unit 331, a pressing controlling unit 332, a work position offset calculating unit 334, an end position calculating unit 335, a link parameter storage unit 336, and a correction amount calculating unit 337. Each of the joint controlling units 340 is structured of a motor controlling unit 341 and an output axis angle calculating unit 342.

The CPU 301 of the main controlling unit 330 functions as the trajectory calculating unit 331, the pressing controlling unit 332, the work position offset calculating unit 334, the end position calculating unit 335 and the correction amount calculating unit 337, according to the program 320. The link parameter storage unit 336 is, for instance, the HDD 304.

In addition, the motor controlling unit 341 of each of the joint controlling unit 340 has functions of the CPU 351 and the motor drive circuit 365 which are operated by the program 370. The output axis angle calculating unit 342 has a function of the CPU 351 which is operated by the program 370.

Firstly, the control operation of the main controlling unit 330 will be described below.

The trajectory calculating unit 331 calculates an operation (trajectory) of the robot arm 201, based on the data of the teaching point. The teaching point is set as a point on a joint space or a task space, by the teaching pendant 400 which a worker operates.

The parameter which shows the degree of freedom of the robot arm 201 shall be represented by the joint angle, and the joint angles of the joints J1 to J6 of the robot arm 201 shall be represented by $\theta_1$ to $\theta_6$, respectively. The configuration of the robot arm 201 is expressed by $(\theta_1, \theta_2, \theta_3, \theta_4, \theta_5, \theta_6)$, and can be regarded as one point on the joint space. Thus, when the parameter which expresses the degree of freedom of the robot arm 201 (for instance, joint angle and length of extension and contraction) is determined to be values on coordinate axes, the configuration of the robot arm 201 can be expressed as a point on the joint space. In other words, the joint space is a space on the coordinate axes to which the joint angles of the robot arm 201 correspond.

In addition, a tool center point (TCP) is already set in the robot hand 202. The TCP is expressed by three parameters (x, y, z) which express a position in a base coordinate system $\Sigma_2$ and three parameters $(\alpha, \beta, \gamma)$ which express the attitude (rotation), in other words, by six parameters $(x, y, z, \alpha, \beta, \gamma)$, and can be regarded as one point on the task space. In other words, the task space is a space which is specified by these six coordinate axes.

The trajectory calculating unit 331 generates a path of the robot arm 201, which connects a plurality of set teaching points, according to a predetermined interpolation method (for instance, linear interpolation, circular interpolation, joint interpolation or the like). Then, the trajectory calculating unit 331 generates a trajectory of the robot arm 201 from the generated path of the robot arm 201.

Here, the path of the robot arm 201 is an ordered set of the points in the joint space or in the task space. The trajectory of the robot arm 201 is a trajectory which shows a path by using a time period as a parameter, and is a set of the position commands for the motors 231 of each of the joints J1 to J6 at each time, in the first embodiment.

The trajectory data is previously calculated before the robot arm 201 is operated, and is stored (set) in the storage unit, for instance, in the HDD 304.

Incidentally, the case will be described below where the trajectory data is calculated by the CPU 301 of the main controlling unit 330, but the trajectory data may be calculated by an unillustrated another computer, and be previously stored (set) in the storage unit of the main controlling unit 330, for instance, in the HDD 304.

The pressing controlling unit 332 acquires the force detection result which has been detected by the force sensor 260 through the stress calculator 343, and performs compliance control processing so that the force is kept constant. While performing the compliance control, the pressing controlling unit 332 makes the robot arm press (strike) a work W3 for measurement (that will be described later), which is a symmetrically shaped member and is grasped by the robot hand 202, against a reference jig W4 (that will be described later) which is a reference member, with a fixed force, by using the result calculated by the trajectory calculating unit 331.

The link parameter of the robot arm 201 is previously stored (set) in the link parameter storage unit 336. The link parameter of the robot arm 201 is a parameter which expresses the lengths of each of the links 210 to 216 that constitute the robot arm 201, and the positional relationships among each of the joints J1 to J6.

The end position calculating unit 335 acquires the data of the joint angle which has been detected by the encoder 236, from the output axis angle calculating unit 342 of the joint controlling unit 340 that controls the driving of each of the joints J1 to J6 (joint J1 in FIG. 4). The end position calculating unit 335 also reads out the link parameter of the robot arm 201 which is stored in the link parameter storage unit 336.

Then, the end position calculating unit 335 computes based on these input data (information) according to the forward kinematics of the robot arm 201, and calculates the position (end position) of the end portion (end portion of link 216) of the robot arm 201.

The work position offset calculating unit 334 calculates the position offset of the central axis of the work W3 for measurement occurring when the robot hand 202 is rotated, in other words, the position offset of the central axis of the plurality of fingers 220 occurring when the robot hand 202 grips the work to be actually assembled.

The correction amount calculating unit 337 calculates a correction amount of the trajectory data at the time of actual operation, based on the data of the position offset (eccentricity) sent from the work position offset calculating unit 334.

At the time of the actual assembly operation, the correction amount calculating unit 337 adds the correction amount calculated in the correction amount calculating unit 337 to the position command (trajectory data) sent from the trajectory calculating unit 331, and output the resultant value to the motor controlling unit 341 of each of the joint controlling units 340, which controls the position of each of the motors 231, as a new position command.

Next, each of the joint controlling units 340 will be described below. The motor controlling unit 341 receives the position command which shows a value that the position command sent from the trajectory calculating unit 331 has been added to the correction amount of the correction amount calculating unit 337. The position command sent from the trajectory calculating unit 331 is a position command which has been calculated based on the teaching point, as has been described above. The motor controlling unit 341 performs the position control (feedback control) for the motor 231 so that the rotation position of the motor 231 approaches the position command, with reference to the input position command and the value of the encoder 235. The output axis angle calculating unit 342 calculates the value of the joint angle, based on the value which shows the angle detection result of the encoder 236.

Figure 5:
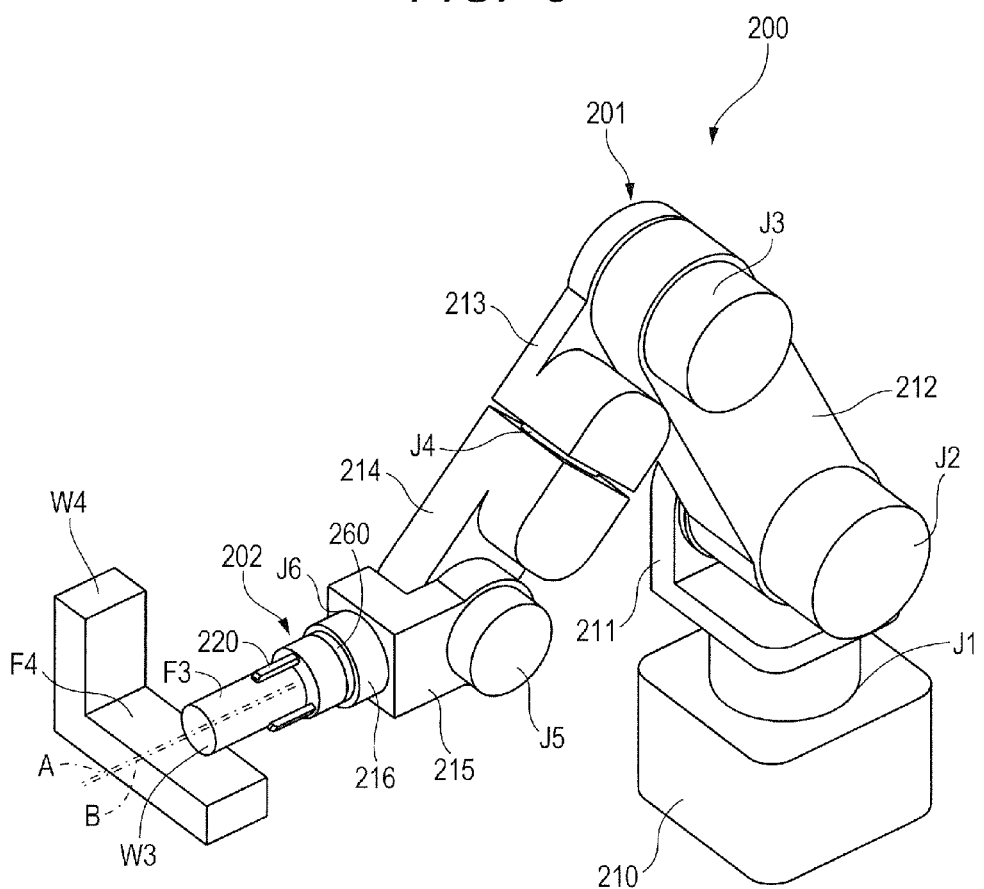
FIG. 5 is a perspective view illustrating a robot of the robot apparatus according to the first embodiment.

Next, the case will be described below where the operation of the robot arm 201 is calibrated, in other words, the case where the position of the robot hand 202 is calibrated. FIG. 5 is a perspective view illustrating the robot of the robot apparatus according to the first embodiment of the present invention. On the work bench to which the robot arm 201 is fixed, the reference jig W4 that is a reference member is removably fixed. In other words, the reference jig W4 is fixed on the work bench so as not to move relatively to the robot arm 201. At the time of the measurement for calibration, the work W3 for measurement is gripped by the robot hand 202.

The work W3 for measurement is a symmetrically shaped member which has a shape that is rotationally symmetric with respect to the central axis B. The work W3 for measurement has such a cylindrical shape (columnar shape) in which the work W3 for measurement is processed with high precision to have high circularity in the cross section, in the first embodiment.

The link 216 of the robot arm 201 is rotated around the end axis A, with respect to the link 215. In other words, the end axis A is a central axis of the rotation of the link 216. In the first embodiment, a gradient of the central axis B to the end axis A shall be an allowable value or less.

The reference jig W4 has a flat surface (reference plane) F4. The flat surface F4 of the reference jig W4 is formed into a precision surface which has been finished to have high precision. The robot arm strikes the outer periphery F3 of the work W3 for measurement, of which the surface has been finished with high precision, against the flat surface F4 of the reference jig W4 with a fixed force, and thereby the robot apparatus can measure the central axis B (in other words, central axis of robot hand 202) of the work W3 for measurement, which is gripped by the robot hand 202, with high precision.

Figure 6:
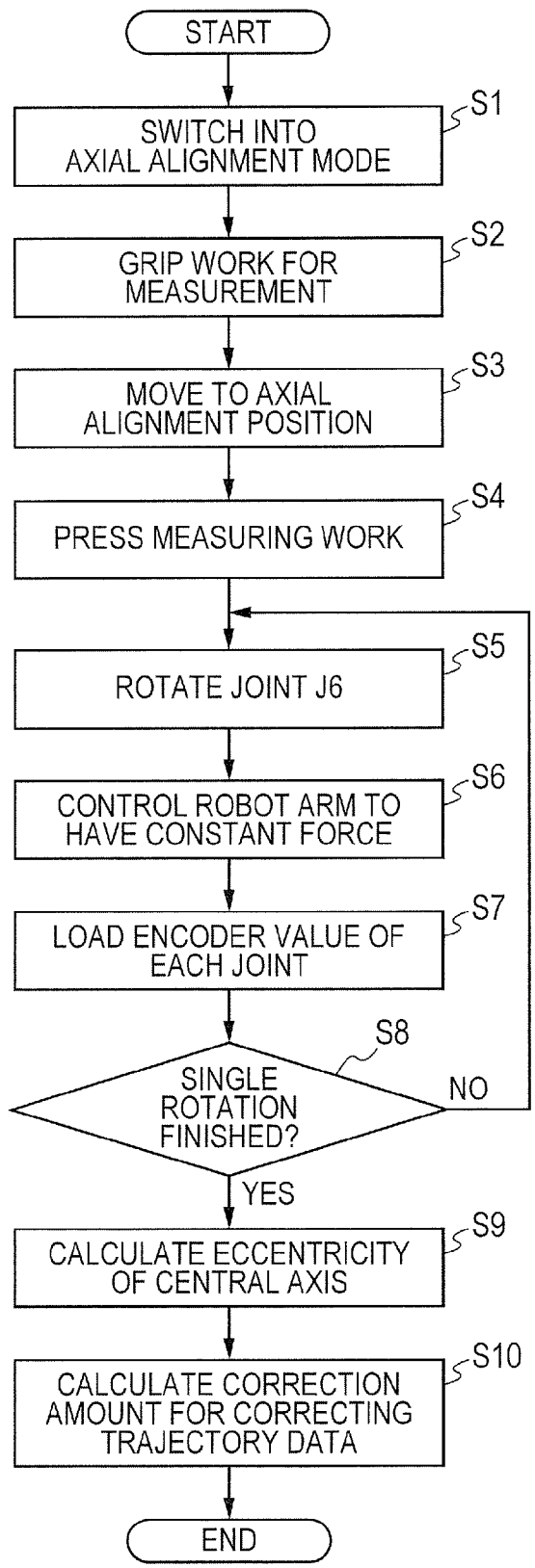
FIG. 6 is a flow chart illustrating a robot controlling method according to the first embodiment.

Next, a robot controlling method in which the control apparatus 300 controls the operation of the robot 200, in other words, a method of calibrating the position of the robot hand 202 will be described below. FIG. 6 is a flow chart illustrating the robot controlling method according to the first embodiment of the present invention. In the first embodiment, the correcting operation by the robot 200 is an axial alignment operation of pressing the work W3 for measurement against the reference jig W4.

Firstly, the CPU 301 sets a control mode for the robot arm 201 to the axial alignment mode (S1). The axial alignment mode is a correcting operation which is firstly performed when the robot hand 202 has been exchanged. Specifically, when the robot hand 202 is attached to the robot arm 201, the central axis B of the robot hand 202 (in other words, central axis of work) occasionally deviates from the end axis A of the robot arm 201, and the calibration is necessary. Accordingly, in the first embodiment, right after the robot hand 202 has been attached to the robot arm 201, the robot apparatus calibrates the position of the robot 200 in the axial alignment mode. Specifically, the robot apparatus corrects the trajectory data, and calibrates the position of the robot hand 202.

The CPU 301 controls the operation of the robot arm 201 and the robot hand 202 so that the robot hand 202 grips the work W3 for measurement (S2: gripping step).

Next, the CPU 301 controls the operation of the robot arm 201 so that the robot hand 202 which grips the work W3 for measurement moves to the position of the reference jig W4 (pressing position of work for measurement, in other words, axial alignment position) (S3).

Next, the CPU 301 controls the operation of the robot arm 201 so that the robot arm 201 strikes the outer periphery F3 of the work W3 for measurement against the flat surface F4 of the reference jig W4, with a fixed force (S4). In this case, the CPU 301 controls the operation so that the robot arm 201 presses the work W3 for measurement with a fixed force, based on the information detected by the force sensor 260. At this time, the force sensor 260 detects the force which is exerted on the robot hand 202, and accordingly the CPU 301 acquires the result of the force detected by the force sensor 260, as a force with which the work W3 for measurement strikes against the reference jig W4.

Next, the CPU 301 makes the joint J6 rotate in the state in which the work W3 for measurement strikes against the reference jig W4 (S5: operating). Specifically, the CPU 301 makes the link 216 of the robot arm 201 rotate around the end axis A, in the state of making the outer periphery F3 of the work W3 for measurement, which is gripped by the robot hand 202, strike against the flat surface F4 of the reference jig W4. At this time, the CPU 301 controls the operation of each of the joints J1 to J5 of the robot arm 201 so that the fixed force is kept with which the outer periphery A3 of the work W3 for measurement strikes against the reference jig W4 (S6: operating).

Furthermore, the CPU 301 acquires the value of the encoder 236 of each of the joints J1 to J6 (joint angle detected by each of encoders 236) (S7: acquiring).

Next, the CPU 301 determines whether or not the joint J6 (link 216) has spun around 360 degrees (S8: determining). The CPU 301 performs this determination, based on the joint angle which has been detected by the encoder 236 of the joint J6.

The CPU 301 continues the processes of the steps S5 to S7 until the link 216 (work W3 for measurement) spins around 360 degrees in the step S8.

When having determined that the robot hand 202 has reached the end position of the rotation in the step S8 (S8: Yes), the CPU 301 makes the operation of the robot arm 201 stop.

Next, the CPU 301 calculates information on the eccentricity of the central axis B of the work W3 for measurement with respect to the end axis A of the link 216 (S9). Here, the information on the eccentricity (axis offset information) is an eccentric direction (axis offset direction) of the central axis B with respect to the end axis A, and the eccentricity amount (axis offset quantity) of the central axis B with respect to the end axis A.

The CPU 301 calculates the correction amount for the trajectory data based on the eccentricity of the central axis B with respect to the end axis A, and records the calculated correction amount in the storage unit (for instance, HDD 304) (S10). Specifically, the CPU 301 calculates the correction amount of such trajectory data (position command for each of motors 231) that the position (end position) of the end portion of the robot arm 201 based on the trajectory data before the correction moves to an opposite direction to the eccentric direction only by the same amount as the eccentricity amount. Thereby, the operation of forming the correction data ends.

Figure 7:
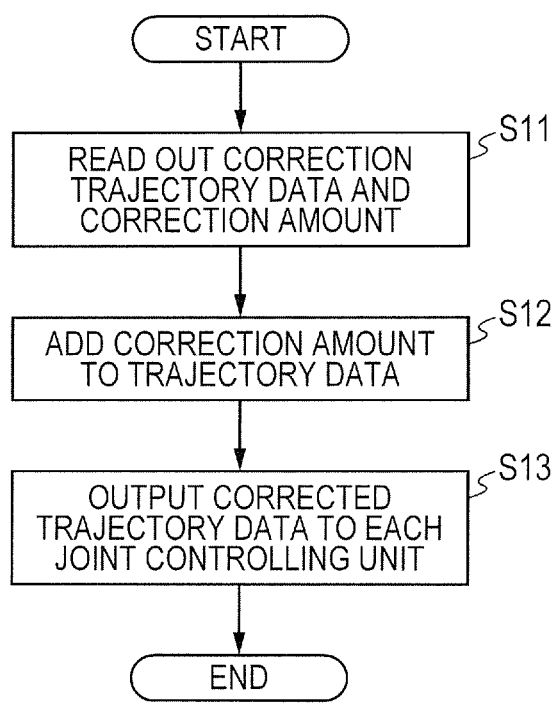
FIG. 7 is a flow chart illustrating a robot controlling method according to the first embodiment.

Next, the case will be described below where the robot arm 201 is operated in a production line. FIG. 7 is a flow chart illustrating a robot controlling method according to the first embodiment of the present invention.

When making the robot arm 201 operate according to the trajectory data in the production step, the CPU 301 reads out the trajectory data (position command for each of motors 231) and the correction amount, which have been stored in the storage unit such as the HDD 304 (S11). Then, the CPU 301 performs the correction of adding the correction amount to the trajectory data (S12). As has been described above, the trajectory data are corrected by the processes in the steps S9 to S12 (correcting).

The CPU 301 outputs the trajectory data (position command for each of motors 231) which has been corrected, to each of the joint controlling units 340, and thereby controls the robot arm 201 so as to operate according to the corrected trajectory data (S13).

In the first embodiment, the robot apparatus corrects the data of the trajectory on which the robot arm 201 moves when being operated, and accordingly does not need to perform a complicated adjustment operation for the robot hand 202. In addition, the robot apparatus calculates the correction amount based on the eccentricity of the central axis B with respect to the end axis A from the angle of each of the joints of the robot arm 201, corrects the trajectory data based on the correction amount, and accordingly can calibrate the position of the robot hand 202 without using special measuring instrument such as a micro displacement measure.

In addition, in the first embodiment, the robot apparatus detects a force which is exerted on the robot hand 202, in other words, the force with which the work W3 for measurement strikes against the reference jig W4, by the force sensor 260. Furthermore, the robot apparatus does not measure the position offset of the robot hand 202 by detecting the change of the fine force, but controls the robot arm 201 so that the force to be detected becomes constant, and measures the deviation of the end position of the robot arm 201, based on the joint angle of each of the joints.

The detection precision and the rigidity of the force sensor 260 have a trade-off relationship; and in the first embodiment, the detection precision of the force sensor 260 may have a level of detecting the fixed force, and does not need to have a level of detecting a fine force. In addition, even when the resolution of the encoder 236 is enhanced, the rigidity of the robot arm 201 does not lower. Accordingly, even though the rigidity of the force sensor 260 is enhanced, the robot apparatus can measure the end position of the robot arm 201 with high precision. Therefore, in the first embodiment, the robot apparatus can calibrate the position of the robot hand 202 with high precision, by correcting the trajectory data.

Incidentally, the case has been described above where the robot apparatus sequentially corrects the trajectory data when operating the robot arm 201, but the present invention is not limited to the case. The robot apparatus may store the trajectory data after the correction process in which trajectory data has been corrected by the correction amount, in the storage unit such as the HDD 304. Accordingly, when operating the robot arm 201, the CPU 301 may only read out the trajectory data after the correction process, which has been stored in the storage unit such as the HDD 304, and does not need to sequentially perform correcting computation.

Here, a method for calculating the eccentricity of the central axis B of the work W3 for measurement, which the robot hand 202 grips, with respect to the end axis A of the robot arm 201 will be described specifically below.

Figure 8A:
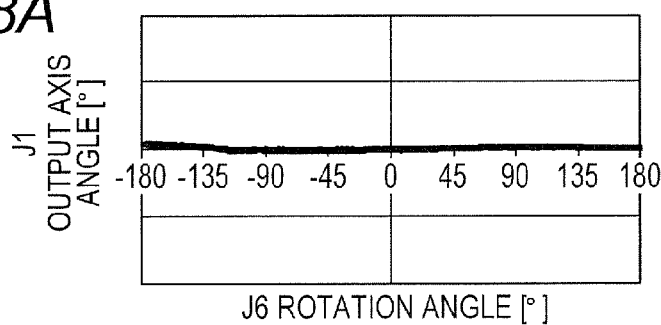
FIG. 8A is a graph illustrating a change of an angle of a joint J1 with respect to an angle of a joint J6 of the robot arm, in the first embodiment.
Figure 8B:
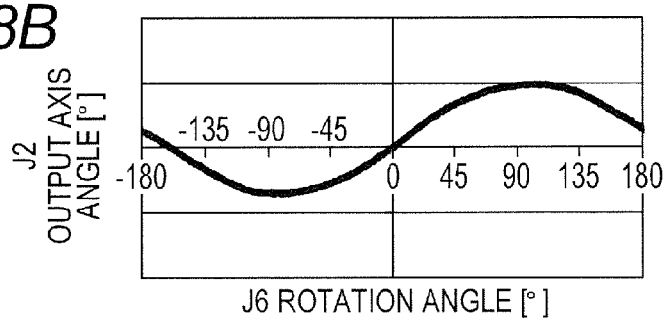
FIG. 8B is a graph illustrating a change of an angle of a joint J2 with respect to the angle of the joint J6 of the robot arm, in the first embodiment.
Figure 8C:
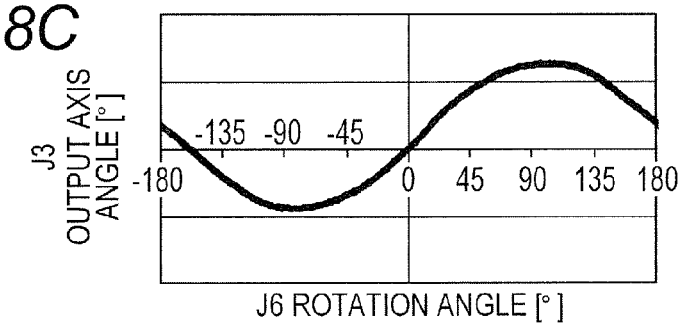
FIG. 8C is a graph illustrating a change of an angle of a joint J3 with respect to the angle of the joint J6 of the robot arm, in the first embodiment.
Figure 8D:
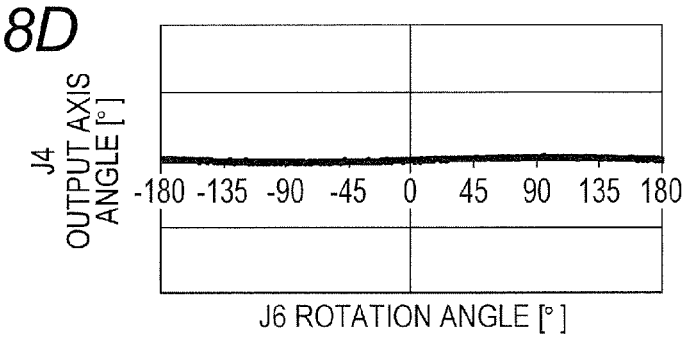
FIG. 8D is a graph illustrating a change of an angle of a joint J4 with respect to the angle of the joint J6 of the robot arm, in the first embodiment.
Figure 8E:
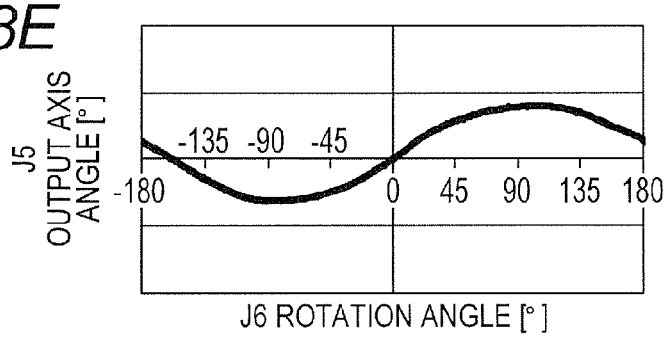
FIG. 8E is a graph illustrating a change of an angle of a joint J5 with respect to the angle of the joint J6 of the robot arm, in the first embodiment.

FIGS. 8A to 8E are graphs each illustrating a change of the joint angle of each of the joints J1 to J5, with respect to the rotation angle of the end portion (joint J6) of the robot arm 201. Specifically, FIG. 8A is a graph illustrating a change of the angle of the joint J1, with respect to the angle of the joint J6. FIG. 8B is a graph illustrating a change of the angle of the joint J2, with respect to the angle of the joint J6. FIG. 8C is a graph illustrating a change of the angle of the joint J3, with respect to the angle of the joint J6. FIG. 8D is a graph illustrating a change of the angle of the joint J4, with respect to the angle of the joint J6. FIG. 8E is a graph illustrating a change of the angle of the joint J5, with respect to the angle of the joint J6. The graphs illustrated in FIGS. 8A to 8E each show the change while setting the output axis angle of the joint J6, which the output axis angle calculating unit 342 has calculated from the value of the encoder 236, at a horizontal axis, and setting an output angle value of each of the joints J1 to J5 at a vertical axis.

Figure 9A:
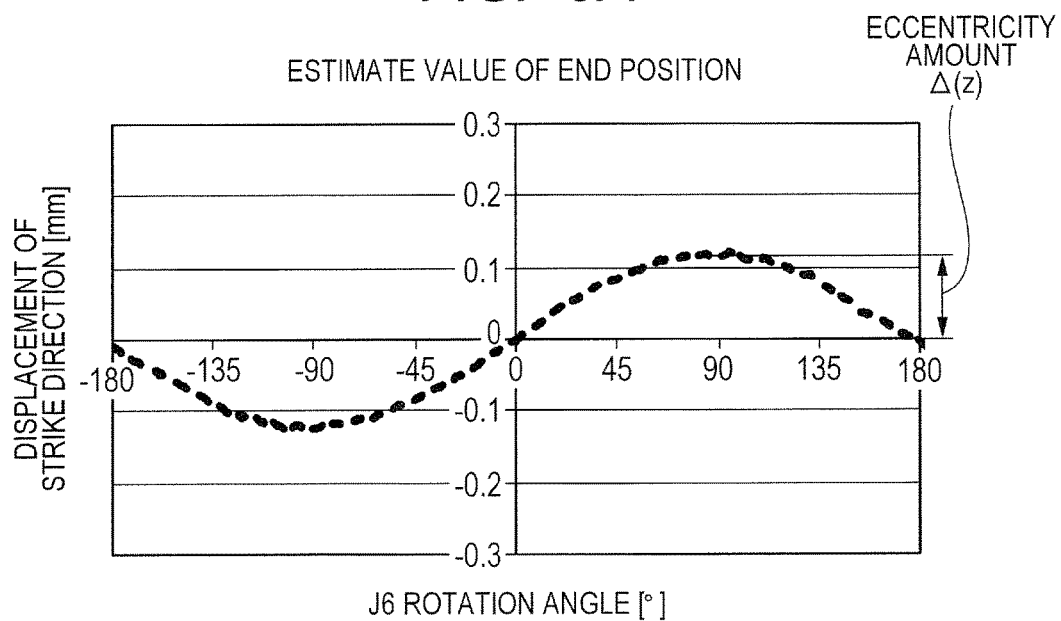
FIG. 9A is a graph illustrating experimental data on estimate value for displacement of a strike direction of an end portion of the robot arm, with respect to a rotation angle of the end portion of the robot arm, in the first embodiment.
Figure 9B:
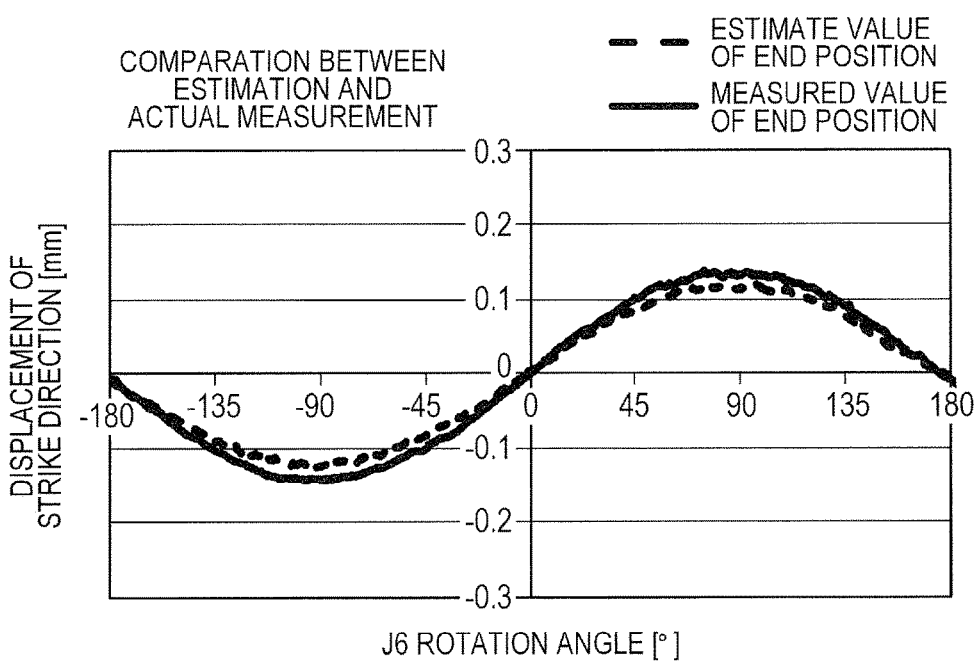
FIG. 9B is a graph illustrating data of an experiment which has compared the estimate values of the displacement of the strike direction of the end portion of the robot arm with respect to the rotation angle of the end portion of the robot arm, with measured values thereof, in the first embodiment.

FIG. 9A is a graph illustrating experimental data on estimate values of displacement of a strike direction of the end (link 216) of the robot arm 201, with respect to the rotation angle of the joint J6. FIG. 9B is a graph illustrating data of an experiment which has compared the estimate values of the displacement of the strike direction of the end (link 216) of the robot arm 201 with respect to the rotation angle of the joint J6, with measured values thereof. It can be understood in the result of the comparison between the estimate values and the measured values illustrated in FIG. 9B that the actual displacement can be estimated from the output angle values of each of the joints J1 to J6.

The CPU 301 solves the forward kinematics by using the joint angles and the link parameters of the joints J1 to J6 of the robot arm 201, and thereby calculates the position of the end of the robot arm 201. The displacement of the strike direction at the time when the joint J6 (link 216) is rotated in the state in which the work W3 for measurement strikes against the reference jig W4 with a fixed force in the steps S5 to S7 shows a relationship illustrated in FIG. 9A and FIG. 9B, with respect to the rotation of the joint J6.

Here, the end axis A is a central axis of the rotation of the joint J6 (link 216), and the central axis B is a central axis (hand central axis) of the work W3 for measurement. The eccentricity amount of the central axis B with respect to the end axis A is represented by $\Delta(z)$, and the radius of the work W3 for measurement is represented by R.

Figure 10A:
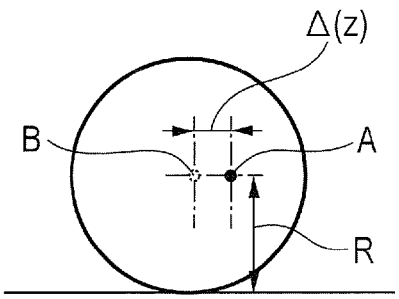
FIG. 10A is an explanatory view illustrating a position of a work for measurement at the time when the rotation angle of the end portion of the robot arm is 0 degree.
Figure 10B:
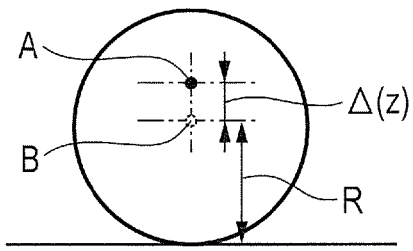
FIG. 10B is an explanatory view illustrating a position of a work for measurement at the time when the rotation angle of the end portion of the robot arm is 90 degrees.
Figure 10C:
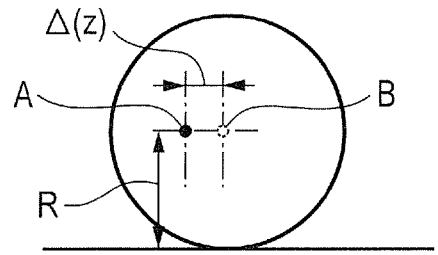
FIG. 10C is an explanatory view illustrating a position of a work for measurement at the time when the rotation angle of the end portion of the robot arm is 180 degrees.
Figure 10D:
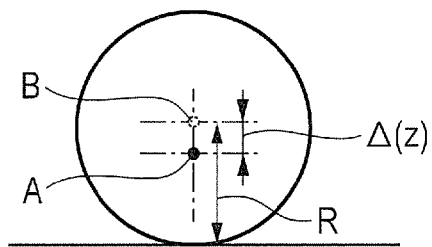
FIG. 10D is an explanatory view illustrating a position of a work for measurement at the time when the rotation angle of the end portion of the robot arm is 270 degrees.

FIGS. 10A to 10D are explanatory views illustrating positions of the work W3 for measurement with respect to the rotation angle of the joint J6 in the state in which the work W3 for measurement strikes against the reference jig W4 with a fixed force. The Figures will be specifically described below. FIG. 10A is an explanatory view illustrating a position of the work W3 for measurement at the time when the rotation angle of the joint J6 is 0 degree. FIG. 10B is an explanatory view illustrating a position of the work W3 for measurement at the time when the rotation angle of the joint J6 is 90 degrees. FIG. 10C is an explanatory view illustrating a position of the work W3 for measurement at the time when the rotation angle of the joint J6 is 180 degrees. FIG. 10D is an explanatory view illustrating a position of the work W3 for measurement at the time when the rotation angle of the joint J6 is 270 degrees.

In FIGS. 10A to 10D, the rotation direction of the joint J6 shall be counter-clockwise around the end axis A. When the rotation angle of the joint J6 is 0 degree, a distance between the end axis A and the reference plane F4 in a Z direction (striking direction) is R (FIG. 10A). When the rotation angle of the joint J6 is 90 degrees, the distance between the end axis A and the reference plane F4 in the Z direction increases compared to R only by the eccentricity amount $\Delta(z)$ (FIG. 10B). When the rotation angle of the joint J6 is 180 degrees, a distance between the end axis A and the reference plane F4 in the Z direction becomes R (FIG. 10C). When the rotation angle of the joint J6 is 270 degrees, the distance between the end axis A and the reference plane F4 in the Z direction decreases compared to R by the eccentricity amount $\Delta(z)$ (FIG. 10D).

Therefore, when the central axis B of the work W3 is eccentric by the eccentricity amount $\Delta(z)$ with respect to the end axis A which is the central axis of the rotation of the joint J6, the estimate values of the displacement draw an approximately sinusoidal wave curve, in one revolution, and a half (amplitude) of the distance between the upper limit peak and the lower limit peak shows the eccentricity amount $\Delta(z)$, as is illustrated in FIG. 9A. In addition, the direction of the eccentricity of the central axis is calculated from the eccentricity amount $\Delta(z)$ and the rotation angle of the joint J6. Specifically, as is illustrated in FIG. 10B, when the rotation angle of the joint J6 is 90 degrees, the Z direction from the reference plane F4 toward the end axis A is calculated as the eccentric direction.

Thus, the work position offset calculating unit 334 calculates the value of the end position calculating unit 335, and thereby the robot apparatus can determine the information on the eccentricity, which is formed of the eccentricity amount and the eccentric direction of the central axis B that is gripped by the work, with respect to the end axis A that is the central axis of the rotation of the joint J6, with high precision.

Second Embodiment

Figure 11:
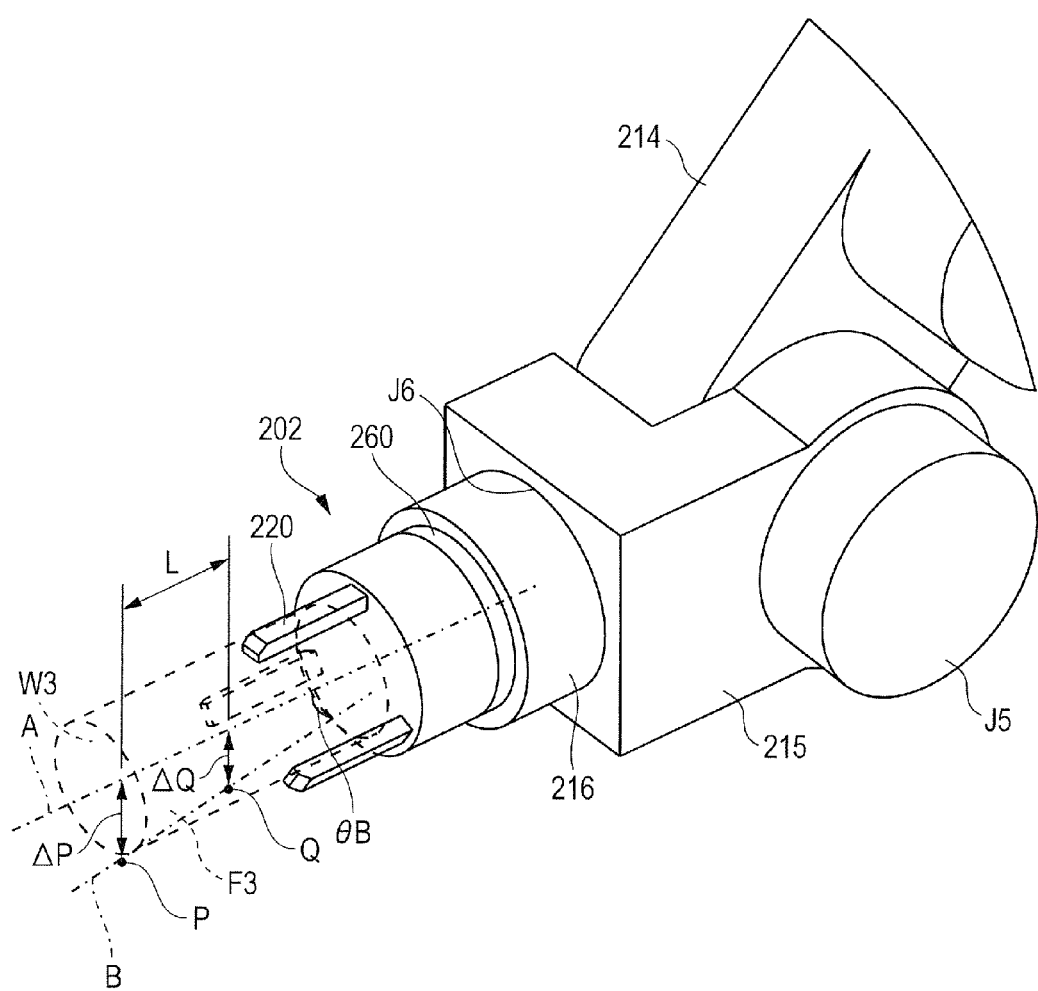
FIG. 11 is a perspective view illustrating an end portion of a robot arm and a robot hand according to a second embodiment.

Next, a robot controlling method in a robot apparatus according to a second embodiment of the present invention will be described below. FIG. 11 is a perspective view illustrating an end portion of the robot arm 201 and the robot hand 202 according to the second embodiment of the present invention.

In the first embodiment, the case has been described where a gradient of the central axis B of the work W3 for measurement is an allowable value or less with respect to the end axis A of the robot arm 201, but the gradient occasionally exceeds the allowable value. In the second embodiment, the case will be described below where also the gradient is calibrated. Incidentally, the structure of the robot apparatus is similar to that of the robot apparatus 100 in the first embodiment, and accordingly the description will be omitted.

The central axis (central axis of robot hand) B of the work occasionally tilts with respect to the end axis A of the work W3 for measurement, as is illustrated in FIG. 11. The examples include the case where the robot hand 202 tilts with respect to the robot arm 201 (force sensor 260), and the case where a grasped work tilts due to the dispersion of the positions of the plurality of fingers 220.

In the second embodiment, in order to correct the gradient, the force sensor measures a P point (first portion: in the second embodiment, the end position in the outer periphery F3 of the work W3 for measurement), and the CPU 301 calculates an offset quantity ΔP. Next, the force sensor measures a point Q (second portion) which is different from the point P in the direction of the end axis A, and the CPU 301 calculates an offset quantity ΔQ. A distance between the point P and the point Q in the direction of the end axis A shall be represented by L. The CPU 301 calculates each of the offset quantity ΔP and the offset quantity ΔQ, and thereby determines a gradient θB. The CPU 301 corrects the position offset, based on the calculation result on the gradient θB and the offset quantity ΔP.

The process will be specifically described below. The CPU 301 performs the steps S5 to S7 (see FIG. 6) in each of the case where the robot hand has struck the point P in the outer periphery F3 of the work W3 against the reference jig W4, and the case where the robot hand has struck the point Q in the outer periphery F3 of the work W3 against the reference jig W4. In the second embodiment, the point P is an end portion on the outer periphery F3 of the work W3 for measurement, and the point Q is a middle portion in the outer periphery F3 of the work W3 for measurement. The point Q of the work W3 moves the end of the robot arm 201 by the distance L, from the point P in the J6 axis direction, and thereby strikes the end of the robot arm 201 against the reference jig W4.

In the step S9, the CPU 301 calculates the information on the eccentricity of the central axis B with respect to the end axis A, and the information on the gradient of the central axis B with respect to the end axis A, by using the result which the CPU 301 has acquired in the step S7. The CPU 301 calculates a correction amount for use in correcting the trajectory data in a step S10, from the information on the eccentricity (eccentric direction and eccentricity amount) and the information on the gradient (gradient angle). Specifically, the CPU 301 calculates the correction amount so that the end portion of the robot arm 201 moves by the same amount as the eccentricity amount in a reverse direction to the eccentric direction with respect to the position of the end portion of the robot arm 201 based on the trajectory data, and so that the end portion of the robot arm 201 moves by the same angle in a reverse direction to the gradient angle.

The process will be described below in detail. The CPU 301 determines each of the offset quantities ΔP and ΔQ from the detection result which the CPU 301 has acquired when the point P has been struck against the reference jig W4 in the step S9, and from the detection result which the CPU 301 has acquired when the point Q has been struck against the reference jig W4 in the step S9. At this time, the CPU 301 determines each of the offset quantities ΔP and ΔQ of the central axis B with respect to the end axis A, when the points P and Q have been struck against the reference jig W4, respectively, on such a condition that the link 216 of the robot arm 201 is set at the same rotation angle. The offset quantities ΔP and ΔQ and the eccentric direction are calculated in a similar way to those in the first embodiment.

The CPU 301 determines the information on the gradient (gradient angle θ) from these two offset quantities ΔP and ΔQ, and the distance L. The information on the gradient becomes proportional to a triangle, and is expressed by the following expression.

$$\theta = \arctan((\Delta P + \Delta Q)/L)$$

As has been described above, the robot apparatus according to the second embodiment can calibrate the operation of the robot arm 201, in other words, the position of the robot hand 202 with high precision, without needing a special measuring instrument, and without adjusting the position (specifically, position of finger 220) of the robot hand 202. Furthermore, the robot apparatus according to the second embodiment corrects the eccentricity and the gradient of the central axis B with respect to the end axis A, and accordingly can calibrate the position of the robot hand 202 with higher precision.

Third Embodiment

Figure 12:
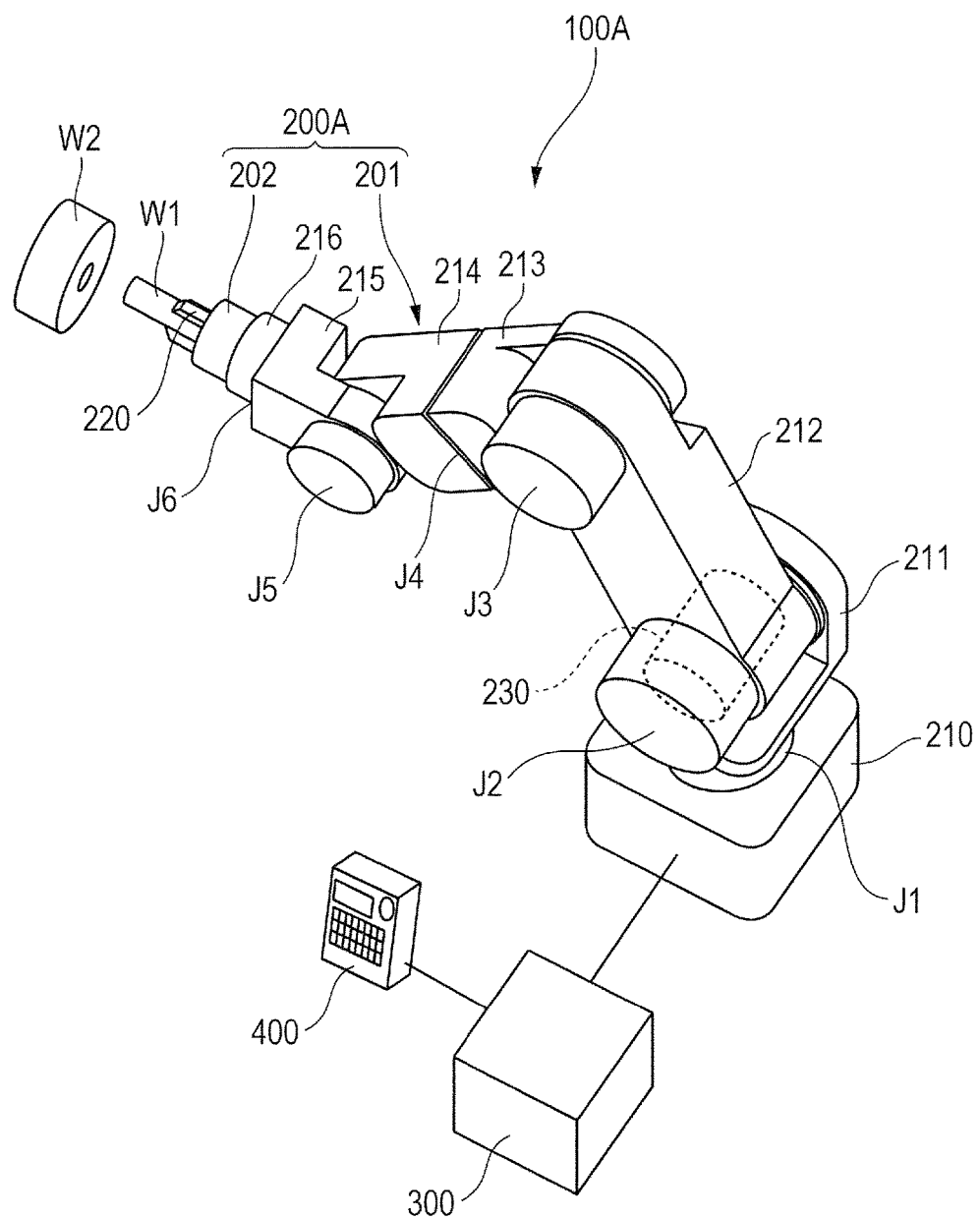
FIG. 12 is a perspective view illustrating a robot apparatus according to a third embodiment.
Figure 13:
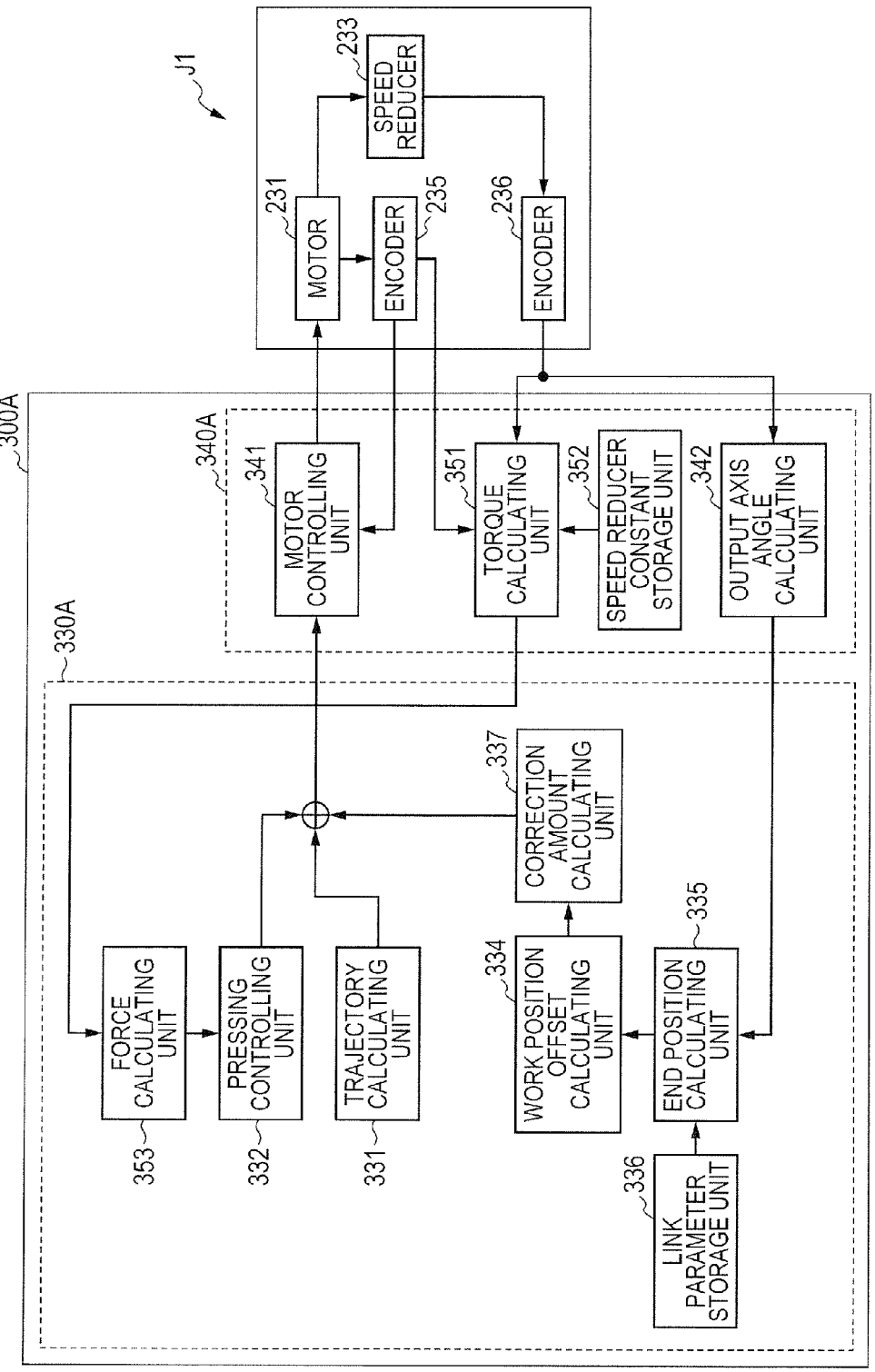
FIG. 13 is a functional block diagram illustrating a configuration of an essential part of the robot apparatus according to the third embodiment.

Next, a robot controlling method in a robot apparatus according to a third embodiment of the present invention will be described below. FIG. 12 is a perspective view illustrating the robot apparatus according to the third embodiment of the present invention; and FIG. 13 is a functional block diagram illustrating a configuration of an essential part of the robot apparatus according to the third embodiment of the present invention. In FIG. 12 and FIG. 13, the same structures as those in the first and second embodiments are designated by the same reference numerals and the description will be omitted; and different points will be described below.

In the third embodiment, the robot apparatus does not use the force sensor, but calculates a torque of each of the joints from the angle information that has been detected by the encoder 236 in an output side of each of the joints, in the step of pressing the work against the reference jig with a fixed force, and the robot arm presses the work against the reference jig with the fixed force, which are the points different from those in the first and second embodiments.

Specifically, the robot apparatus 100A has a robot 200A having the robot arm 201 and a robot hand 202, a control apparatus 300A, and a teaching pendant 400. The robot 200A is different from the robot in the above described first embodiment, and does not have the force sensor. The robot hand 202 is attached directly to the end portion of the robot arm 201, and the force sensor is not provided there.

The control apparatus 300A in the third embodiment is a control apparatus in which the stress calculator 343 in the control apparatus 300 in FIG. 3 is omitted, and the other configuration is approximately the same as that of the control apparatus 300. In the third embodiment, the program 320 for the main controlling unit 330A and the program 370 for each of the joint controlling units 340A are different from those in the first and second embodiments.

In FIG. 13, as for the control apparatus 300A, the functions of the CPU 301 based on the program 320 are broken into blocks, and the blocks are illustrated; and the functions of the CPU 351 and the functions of the motor drive circuit 365 based on the program 370 are broken into blocks, and the blocks are illustrated. As for the robot 200A, the joint J1 of the robot arm 201 is broken into blocks, and the blocks are illustrated.

The control apparatus 300A has a main controlling unit 330A, and a joint controlling unit 340A which corresponds to each of the joints J1 to J6. In FIG. 13, only the joint J1 and the joint controlling unit 340A which corresponds to the joint J1 are illustrated, but the control apparatus 300A has a plurality of joint controlling units 340A which correspond to the other joints J2 to J6, respectively, though the illustration is omitted.

The main controlling unit 330A is structured of a trajectory calculating unit 331, a pressing controlling unit 332, a work position offset calculating unit 334, an end position calculating unit 335, a link parameter storage unit 336, a correction amount calculating unit 337 and a force calculating unit 353. Each of the joint controlling units 340A is structured of a motor controlling unit 341, an output axis angle calculating unit 342, a torque calculating unit 351 and a speed reducer constant storage unit 352.

The CPU 301 of the main controlling unit 330A functions as the trajectory calculating unit 331, the pressing controlling unit 332, the work position offset calculating unit 334, the end position calculating unit 335, the correction amount calculating unit 337 and the force calculating unit 353, due to the program 320. The link parameter storage unit 336 is, for instance, the HDD 304.

In addition, the motor controlling unit 341 of each of the joint controlling units 340A has the functions of the CPU 351 and the motor drive circuit 365 which operate due to the program 370. The output axis angle calculating unit 342 and the torque calculating unit 351 have the function of the CPU 351 which is operated by the program 370. The speed reducer constant storage unit 352 is, for instance, the EEPROM 352.

The third embodiment does not use the force sensor as an input unit for the force calculating unit 353, but has the torque calculating unit 351 provided that calculates the torque of each of the joints based on the value of the encoder 236, which is the point different from the above described first embodiment.

The torque calculating unit 351 of each of the joint controlling units 340A, and the force calculating unit 353 of the main controlling unit 330A determine a force with which the work W3 for measurement strikes against the reference jig W4, by using the angle detection result of the encoder 235 and the angle detection result of the encoder 236.

At this time, each of the joint controlling units 340A calculates the torque which is exerted on each of the joints J1 to J6, by using the angle detection result of each of the encoders 235 and the angle detection result of each of the encoders 236. The force calculating unit 353 determines the force with which the work W3 for measurement strikes against the reference jig W4, by using the calculation result of the torque of each of the joints J1 to J6.

The above description will be specifically described below. The torque calculating unit 351 of each of the joint controlling units 340A firstly converts the angle detection result which has been detected by the encoder 235 into the angle of the joint at a reduction ratio of the speed reducer 233. Specifically, the torque calculating unit 351 divides the angle detection result of the encoder 235 by the reduction ratio N (for instance, 50). The reduction ratio N of the speed reducer 233 is previously stored (set) in the EEPROM 352.

Next, the torque calculating unit 351 multiples a difference between the angle information of which the angle has been converted and the angle information sent from the encoder 236, by torsional stiffness (spring constant in rotation direction) of the speed reducer 233, which is previously stored (set) in the speed reducer constant storage unit 352. Thereby, the torque calculating unit 351 calculates the torque which is generated in the joint. The torque calculating unit 351 performs the above described torque calculation for each of the joints J1 to J6, and thereby calculates the torque which is generated in each of the joints J1 to J6.

The force calculating unit 353 calculates a force that is exerted on the robot hand 202, in other words, the force with which the work W3 for measurement strikes against the reference jig W4, by using the calculation result of the torque, which has been sent from each of the torque calculating units 351. Specifically, the force calculating unit 353 calculates a resultant force that is generated at an arbitrary position of the robot hand 202, from the calculation result of the torque, which has been sent from the torque calculating unit 351 of each of the axes, and the link parameter of the robot arm 201, which is stored in the link parameter storage unit 336. The link parameter of the robot arm 201 is previously stored (set) in the link parameter storage unit 336. The link parameter of the robot arm 201 is a parameter which expresses the lengths of each of the links 210 to 216 that constitute the robot arm 201, and the positional relationships among each of the joints J1 to J6. The arbitrary position of the robot hand 202 which becomes a reference of calculation shall be, for instance, the center of a palm surface of the robot hand 202.

Thus, the force calculating unit 353 combines the torques to calculate a force to be exerted on the end, and the pressing controlling unit 332 can control the end so as to press the work against the reference jig with a fixed force by impedance control, based on the resultant force.

As described above, the control apparatus 300A according to the third embodiment can correct the end position of the robot arm 201 without using the force sensor, when correcting the end position. Therefore, the control apparatus 300A can be applied also to the robot apparatus 100A which does not have the force sensor mounted therein.

In addition, the robot apparatus 100A does not have the force sensor mounted therein, and accordingly can make a wrist of the robot 200A highly rigid, and the positioning precision of the robot hand 202 is further enhanced.

Incidentally, the present invention is not limited to the above described embodiments, but can be modified in many ways in a range of the technical concept of the present invention. In regard to the effects which have been described in the embodiments of the present invention, the most suitable effects that are created by the present invention are merely enumerated, and the effects according to the present invention are not limited to the effects which have been described in the embodiments of the present invention.

Other Embodiments

In addition, in the third embodiment, the case has been described where each of the joint controlling units 340A calculates the torque, but the present invention is not limited to the case, and the main controlling unit 330A may calculate the torque of each of the joints. In this case, the detection result of each of the encoders 235 and 236 in each of the joints J1 to J6 may be transmitted to the main controlling unit 330A. In addition, the number of the CPUs 301 in the main controlling unit 330A or the number of the CPUs 351 in each of the joint controlling units 340A is not limited to one, but may be a plurality of CPUs.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-050261, filed Mar. 13, 2015, which is hereby incorporated by reference herein in its entirety.

What is claimed is:

1. A robot controlling method in which a robot hand is attached to an end portion of a robot arm having a plurality of joints, each of the joints of the robot arm having a joint driving apparatus driven by a motor and a joint angle detecting unit, the end portion being rotatable around an end axis, and a control apparatus that controls an operation of the robot arm, based on trajectory data for performing the operation, comprising:

the control apparatus making the robot hand grip a symmetrically shaped member having such a shape as to be rotationally symmetric with respect to a central axis of the symmetrically shaped member;

the control apparatus controlling the operation of the robot arm so that the robot arm keeps a force of striking the symmetrically shaped member against a reference member constant, while making the end portion of the robot arm rotate around the end axis, in a state of making the outer periphery of the symmetrically shaped member, which is gripped by the robot hand, strike against the reference member;

the control apparatus acquiring a detection result which has been detected by the joint angle detecting unit of each of the joints when the end portion of the robot arm is rotated in the controlling the operation of the robot arm; and the control apparatus calculating a correction amount of the trajectory data based on the detection result, and correcting the trajectory data, based on the correction amount.

2. The robot controlling method according to claim 1, wherein in the calculating and correcting, the control apparatus calculates a position of the end portion of the robot arm from the detection result, according to forward kinematics;

determines information on the eccentricity of the central axis with respect to the end axis from the calculation result; and calculates the correction amount from the information on the eccentricity.

3. The robot controlling method according to claim 1, wherein:

the control apparatus performs each of the controlling the operation of the robot arm and the acquiring the detection result in making a first portion in the outer periphery of the symmetrically shaped member in a direction of the end axis strike against the reference member, and in making a second portion in the outer periphery of the symmetrically shaped member in the direction of the end axis, which is different from the first portion, strike against the reference member; and in the calculating and correcting, the control apparatus calculates information on the eccentricity of the central axis with respect to the end axis, and information on a gradient of the central axis with respect to the end axis, by using the result which the control apparatus has acquired in the acquiring, and calculates the correction amount from the information on the eccentricity and the information on the gradient.

4. The robot controlling method according to claim 3, wherein:

in the calculating and correcting, the control apparatus determines two offset quantities of the central axis with respect to the end axis, one each in making each of the first portion and the second portion strike against the reference member, from the detection result which the control apparatus has acquired in the acquiring in making the first portion strike against the reference member, and the detection result which the control apparatus has acquired in the acquiring in making the second portion strike against the reference member; and determines the information on the gradient from the two offset quantities and distances between the first portion and the second portion, in the direction of the end axis.

5. The robot controlling method according to claim 1, wherein:

the robot hand is attached to the end portion through a force sensor; and force is a detection value detected by the force sensor.

6. The robot controlling method according to claim 1, wherein:

each of the joints of the robot arm further has a speed reducer;

each of the joints of the robot arm has a motor angle detecting unit which detects a rotation angle of the motor; and the force is a value acquired by using the result of the detected angle by the motor angle detecting unit of each of the joints, and the result of the detected angle by the joint angle detecting unit of each of the joints.

7. The robot controlling method according to claim 6, wherein:

in the controlling the operation of the robot arm, the control apparatus calculates a torque which is exerted on each of the joints, by using the angle detection result of the motor angle detecting unit of each of the joints and the angle detection result of the joint angle detecting unit of each of the joints; and the force, is a value acquired by using the calculation result of the torque of each of the joints.

8. The robot controlling method according to claim 7, wherein:

in the controlling the operation of the robot arm, the control apparatus calculates the torque which is exerted on each of the joints from a difference between a result in which the angle detection result of the motor angle detecting unit has been converted into an angle of each of the joints at a previously set reduction ratio of the speed reducer, and the angle detection result of the joint angle detecting unit of each of the joints, and from previously set torsional stiffness of the speed reducer; and the force is a value acquired from the calculation result of the torques of each of the joints and previously set link parameters of the robot arm.

9. A robot apparatus comprising:
a robot arm having a plurality of joints, each joint having a joint driving apparatus and a joint angle detecting unit;
a force sensor for detecting a force exerted on an end portion of the robot arm;
a robot hand mounted on the end portion of the robot arm, the end portion being rotatable around an end axis by driving a joint closest to the end portion among the plurality of joints; and
a control apparatus that controls an operation of the robot arm based on trajectory data,
wherein the control apparatus corrects the trajectory data based on eccentricity information, and the eccentricity information is acquired based on a detection result by the joint angle detecting unit of each of the joints at a time of rotating the end portion of the robot arm around the end axis to maintain constant a value of the force detected by the force sensor, in a state of making an outer periphery of a symmetrically shaped member, which is gripped by the robot hand, strike against a reference member.

* * * * *